(12) United States Patent
Cayla

(10) Patent No.: US 7,089,476 B2
(45) Date of Patent: Aug. 8, 2006

(54) DATA TRANSMISSION METHOD WITH A LEVEL OF ERROR PROTECTION SELECTED FROM AMONG SEVERAL PRE-DEFINED LEVELS

(75) Inventor: Stéphane Cayla, Viroflay (FR)

(73) Assignee: Nortel Networks Limited, St. Laurent (CA)

( * ) Notice: Subject to any disclaimer, the term of this patent is extended or adjusted under 35 U.S.C. 154(b) by 532 days.

(21) Appl. No.: 10/467,906

(22) PCT Filed: Feb. 15, 2002

(86) PCT No.: PCT/FR02/00592

§ 371 (c)(1),
(2), (4) Date: Aug. 11, 2003

(87) PCT Pub. No.: WO02/069548

PCT Pub. Date: Sep. 6, 2002

(65) Prior Publication Data

US 2004/0153706 A1 Aug. 5, 2004

(30) Foreign Application Priority Data

Feb. 23, 2001 (FR) .................................. 01 02496

(51) Int. Cl.
*H04L 1/18* (2006.01)
(52) U.S. Cl. ..................................................... 714/748
(58) Field of Classification Search ................. 714/748
See application file for complete search history.

(56) References Cited

U.S. PATENT DOCUMENTS 6,356,759 B1 * 3/2002 Mustajarvi .................. 455/450
6,694,135 B1 * 2/2004 Oksala et al. ............... 455/424

FOREIGN PATENT DOCUMENTS

EP 0 735 774 A 10/1996

OTHER PUBLICATIONS

Wang S and al: << An Error Control Design for Multimedia Wireless Networks >> VTC 2000 IEEE 51st. Vehicular Technology Conference Proceedings, New York, NY, IEEE, US vol. 2 of 3. Conf. 51, May 15, 2000, pp. 795-799, XP000967979—ISBN: 0-7803-5719-1 Abstract-p. 796, left column, line 7-p. 797, right column, line 10, figure 1.

(Continued)

*Primary Examiner*—Shelly Chase
(74) *Attorney, Agent, or Firm*—Trop, Pruner & Hu, P.C.

(57) ABSTRACT

The invention relates to a method whereby the control unit produces a sequence of blocks, each comprising a header and data to be transmitted. Each block is transmitted to the destination terminal with a level of error protection which is selected from among several pre-defined levels, the selected level being indicated in a piece of signalling information that accompanies the block transmitted. The header of each block comprises an acknowledgement control field which is activated intermittently by the control unit in order to request an acknowledgement of blocks from the terminal. A higher level of protection is selected for transmitting blocks having a header with an activated acknowledgement control field than for transmitting blocks having a header with a non-activated acknowledgement control field.

7 Claims, 1 Drawing Sheet

OTHER PUBLICATIONS

Liu C-C and al: "Providing Unequal Reliability for Transmitting Layered Video Streams Over Wireless Networks by Multi-Arq Schemes" Proceedings 1999 International Conference on Image Processing. IEEE, New York, US, vol. 3 of 4, Oct. 24, 1999, pp. 100-104, XP000921563—ISBN : 0-7803-5468-0 Abstract p. 100, right column, lines 4-18 p. 101 left column, line 6-right column, line 19, figure 2.

Zhang T and al: "Unequal Packet Loss Protection for Layered Video Transmission" IEEE Transactions on Broadcasting, IEEE Inc. New York, US, vol. 45, n°2, Jun. 1999, pp. 243-252, XP000851913 ISSN: 0018-9316 Abstract p. 246, left column, line 10-right column, line 34, figure 1.

ETSI TS 101 350, Digital cellular telecommunications system (Phase 2+); General Packet Radio Service (GPRS); Overall description of the GPRS radio interface; Stage 2 (GSM 03.64, version 6.3.0., Release 1997), published by l'ETSI (European Telecommunications Standards Institute) in Jul. 1999.

ETSI EN 301 349, Digital cellular telecommunications system (Phase 2+); General Packet Radio Service (GPRS); Mobile Station (MS)—Base Station System (BSS) interface ; Radio Link Control/Medium Access Control (RLC/MAC) protocol (GSM 04.60, version 6.8.1, Release 1997), published by ETSI in Oct. 2000.

ETSI EN 300 909, Digital cellular telecommunications system (Phase 2+); Channel coding (GSM 05.03, version 6.2.1, Release 1997), published by ETSI in Aug. 1999.

* cited by examiner

DATA TRANSMISSION METHOD WITH A LEVEL OF ERROR PROTECTION SELECTED FROM AMONG SEVERAL PRE-DEFINED LEVELS

BACKGROUND OF THE INVENTION

The present invention relates to techniques for transmitting packets in acknowledged mode from a master control unit to a slave terminal.

The invention relates more particularly, among these techniques, to those in which the control unit, which produces a sequence of blocks each comprising a header in addition to the user data, uses a "polling" mechanism to request acknowledgement of packets from the remote terminal. The header of each block then comprises an acknowledgement control field activated intermittently by the control unit so as to request acknowledgement of blocks from the terminal. In response to such a request, the terminal returns a message in which a certain number of previous blocks are acknowledged, positively and/or negatively.

A technique of this kind is used, in particular, for the downlinks (from the network to the mobile terminals) in GPRS ("General Packet Radio Service") networks that have been developed to allow the transmission of data in packet mode in GSM ("Global System for Mobile communications") type cellular networks.

The mechanism for acknowledging the packets may be disturbed when a block whose header has an activated acknowledgement control field is poorly received by the slave terminal. In this case, the terminal does not execute the acknowledgement request, so that the control unit remains uncertain as to the blocks that have been correctly received.

Often, the acknowledgement mechanism is used within the framework of an automatic repeat protocol (ARQ, "Automatic Repeat reQuest") in which the unit sending the packets uses a send window of specified length, positioned onward of the first block which has not yet been positively acknowledged. If an acknowledgement request message has not been correctly received by the remote terminal, the send window may remain blocked at an old position, thereby leading to unnecessary repetitions of already received packets and to significant delays in the transmission of the new packets.

An object of the present invention is to propose an efficient method for transmitting data in packet mode.

Another object is to reduce the risks of blocking of the send windows utilized in certain ARQ mechanisms.

SUMMARY OF THE INVENTION

The invention thus proposes a method for transmitting data in acknowledged mode between a control unit and a terminal, wherein the control unit produces a sequence of blocks each comprising a header and data to be transmitted, and the blocks are transmitted to the terminal, each block being transmitted with a level of protection against errors selected from several predefined levels, the selected level being indicated in signaling information accompanying the transmitted block. The header of each block comprises an acknowledgement control field activated intermittently by the control unit so as to request an acknowledgement of blocks from the terminal. According to the invention, a higher level of protection is selected for the transmission of at least one block whose header has an activated acknowledgement control field than for the transmission of the blocks the acknowledgement control field of whose header is not activated.

The process uses differentiated protection of the transmitted blocks, depending on whether or not they contain an acknowledgement request. The better protection of the acknowledgement requests, which are transmitted in the band with the user data, makes it possible to avoid a large proportion of the blockages that acknowledgement mechanisms might give rise to.

Most often, protection against transmission errors is ensured by a channel coder using a convolutional code or a block code. Different levels of protection are then effected by adjusting the coding rate: introduction of additional redundancy symbols, modification of the structure of the code used, alteration of the degree of puncturing of the code, etc.

Other methods may be used to adapt the level of protection against errors, for example methods of adaptive control of the signals transmission power.

Another aspect of the present invention concerns a packet control unit, comprising means of producing at least one sequence of blocks each comprising data to be transmitted and a header including an acknowledgement control field, means for transmitting the blocks of the sequence to a terminal, means of selecting a level of protection against errors for the transmission of each block of the sequence, from several predefined levels, and means of intermittent activation of the acknowledgement control field in the header of the blocks of the sequence so as to request an acknowledgement of blocks from the terminal to which the block is transmitted. The means of selection are devised to select a higher level of protection for the transmission of at least one block whose header has an activated acknowledgement control field than for the transmission of the blocks the acknowledgement control field of whose header is not activated.

DESCRIPTION OF PREFERRED EMBODIMENTS

Figure 1:
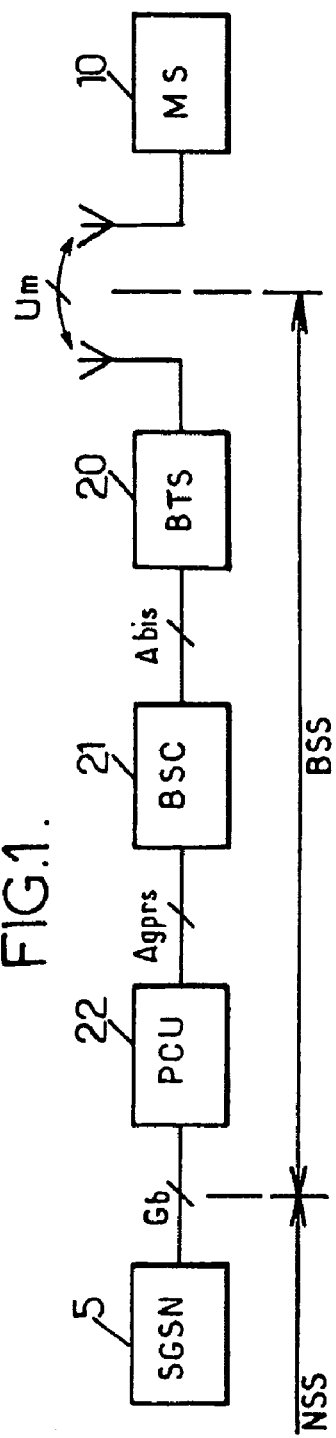
FIG. 1 is a diagram of a GPRS-type network to which the invention may be applied.

The GPRS network illustrated in FIG. 1 is built on a GSM infrastructure, and conventionally divided into a network core, also called Network and Switching Subsystem or NSS, and a radio-access network also called Base Station Subsystem or BSS.

For the packet service, the switches of the NSS are called GPRS support nodes or GSNs. A distinction is made between the SGSNs (Serving GSNs) 5, which are linked to the BSS by way of an interface called Gb, and the GGSNs (Gateway GSNs, not represented) which serve as a gateway with external packet transmission networks, such as the Internet, for example.

A general description of the radio interface, called Um, between the mobile stations (MS) 10 and the base stations (BTS) 20 of the BSS is provided in the technical specification ETSI TS 101 350, "Digital cellular telecommunications system (Phase 2+); General Packet Radio Service (GPRS); Overall description of the GPRS radio interface; Stage 2

(GSM 03.64, version 6.3.0, Release 1997)", published by ETSI (European Telecommunications Standards Institute) in July 1999.

Each base station 20 is supervised by a base station controller or BSC 21 by way of an interface called Abis. In order to manage the transmission of GPRS packets, the BSS further comprises an entity 22 called packet control unit or PCU. The locating of the PCU within the BSS is not standardized. In the example represented in FIG. 1, the PCU 22 is situated between the BSC 21, with which it communicates via an interface called Agprs, and the NSS, with which it communicates via the interface Gb.

Figure 2:
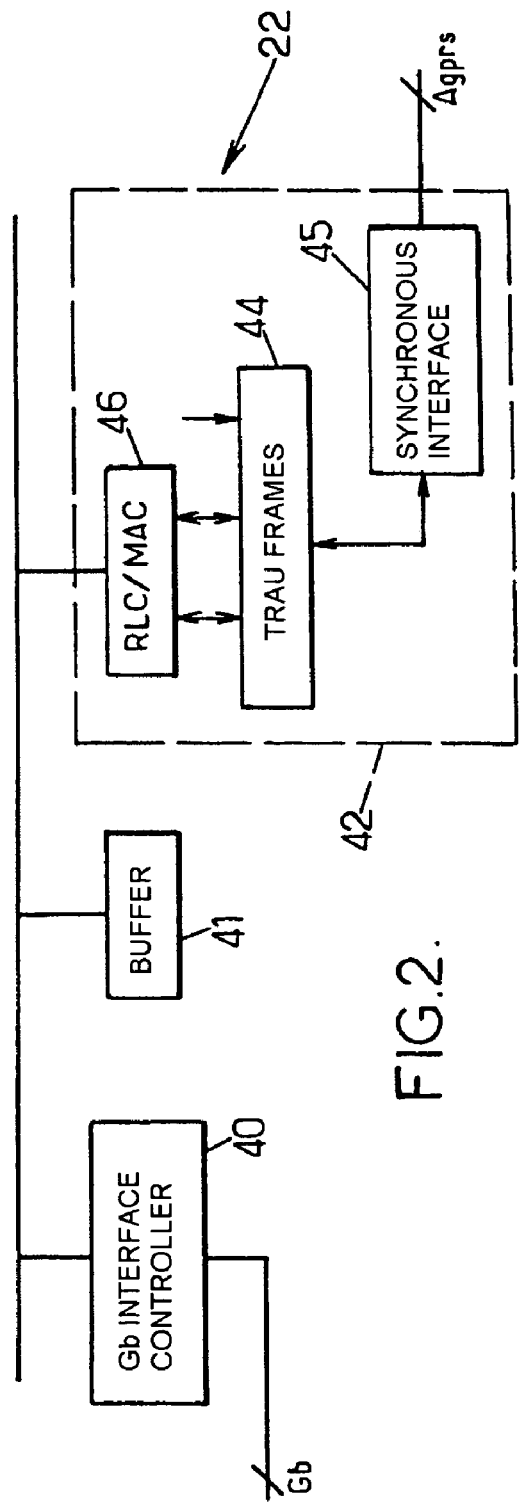
FIG. 2 is a schematic diagram of a packet control unit of such a network, adapted to the implementation of the invention.

FIG. 2 illustrates a possible structure of a PCU 22 situated between an SGSN 5 and a BSC 21, as in the example of FIG. 1. The reference 40 designates the Gb interface controller for the link with the SGSN 5.

The Gb interface is of asynchronous type. It is based on the frame relay (FR) protocol, as well as on a protocol called BSSGP (BSS GPRS Protocol.) which transports routing and quality-of-service information between the BSS and the SGSN. The Gb interface controller 40 provides the physical link with the SGSN 5, as well as carrying out the procedures specific to the FR and BSSGP protocols.

The links between the PCU 22 and the BTSs 20 via the Agprs interface are of synchronous type. Consequently, the data manipulated by the PCU 22 between the Gb interface controller 40 and the Agprs interface controller 42 transit via a buffer memory 41 where packet queues are recorded.

Between the PCU 22 and the BTS 20, the information is carried by 320-bit frames of TRAU (Transcoder/Rate Adapter Unit) type, at the rate of one frame every 20 ms. These TRAU frames are formatted and processed by a module 44 and transmitted by way of synchronous interface circuits 45 which form MIC subchannels at 16 kbit/s with the BTSs 20. Several 16-kbit/s subchannels can be multiplexed on the Agprs interface and separated by the BSC 21 for routing to the BTSs. A module 46 of the Agprs interface controller 42 implements the radio protocols of layer 2 of the OSI model, that is to say the RLC/MAC (Radio Link Control/Medium Access Control) protocols described in the European Standard ETSI EN 301 349, "Digital cellular telecommunications system (Phase 2+); General Packet Radio Service (GPRS); Mobile Station (MS)—Base Station System (BSS) interface; Radio Link Control/Medium Access Control (RLC/MAC) protocol (GSM 04.60, version 6.8.1, Release 1997)", published by ETSI in October 2000.

The RLC sublayer forms the interface with the upper-layer protocol, called LLC (Logical Link Control). It carries out the segmentation and the reassembling of LLC protocol data units (LLC-PDUs), which are exchanged asynchronously on the Gb interface. It produces RLC data blocks to which the MAC sublayer adds a one-byte MAC header.

In the downlink direction, from the PCU to the MSs, the MAC header of each RLC/MAC block includes:

- a three-bit USF (Uplink State Flag) field, serving to indicate which mobile station is authorized to use an uplink resource corresponding to the downlink resource on which the RLC/MAC block is transmitted;
- a three-bit acknowledgement control field, including a one-bit S/P (Supplementary/Polling) subfield indicating whether the acknowledgement control field is active (S/P=1) or inactive (S/P=0) and a two-bit RRBP (Relative Reserved Block Period) subfield uniquely specifying an uplink block in which the mobile station addressed should transmit an acknowledgement message;
- a two-bit Payload Type field, specifying the type of RLC block following (data, control, etc).

It is the transmission of RLC data blocks which is of interest here. Each of these blocks includes an RLC header following the MAC header byte. This RLC header especially includes the following information:

- temporary flow identity (TFI), consisting of five bits identifying the temporary block flow (TBF), from which the RLC data of the block originate. A TBF is a connection supporting the unidirectional LLC-PDU transfer on physical data channels. A TBF is temporary, that is to say that it is maintained only during the data transfer;
- a block sequence number BSN of seven bits, which contains the sequence number of the RLC/MAC block, modulo 128.

The MAC sublayer furthermore manages the multiplexing of the blocks arising from the various TBFs which are active on the available physical channels, arbitrating among the various mobile users via a planning mechanism ("scheduling").

The RLC/MAC entity of the destination mobile station receiving the downlink data blocks from a TBF updates for this flow a reception state variable V(R) which indicates the BSN following the highest BSN received on this TBF. The number V(R)-1 (modulo 128) thus points to the end of a reception window whose length is k=64 RLC/MAC blocks. On receipt of a "polling" command, that is to say of a block whose MAC header has the bit S/P=1, the MS returns in the uplink block specified by the RRBP subfield, an acknowledgement message PDAN ("Packet Downlink Ack/Nack") which comprises in particular:

- a field SSN ("Starting Sequence Number") of seven bits containing the current variable V(R) for the TBF; and
- a field RBB ("Receive Block Bitmap") of k=64 bits indicating those of the blocks of the reception window that have been correctly received. A positive acknowledgement of the block BSN=(SSN-i) mod 128 is indicated by the value 1 of the bit of rank i ($1 \leq i \leq k$) of the RRB bitmap, and a negative acknowledgement by the value 0.

On receipt of the PDAN message, the PCU updates for the TBF an acknowledgement state variable V(A) which contains the BSN of the oldest block that has not been positively acknowledged, as well as a table V(B) with k inputs indicating the respective acknowledgement states (positive acknowledgement/negative acknowledgement/acknowledgement not received) of k consecutive blocks following the one designated by V(A), these k consecutive blocks forming a send window. The state variables V(A) and V(B) are deduced directly from the SSN and RBB fields received in the last PDAN message. The RLC/MAC protocol does not authorize the transmission of blocks other than inside the send window thus managed by the PCU. Outside of this window, the transmission of the blocks is inhibited.

So as not to delay the transmission of the new blocks, it is advisable to avoid the phenomena of blocking of the send window on an obsolete position. Such blocking may in particular occur when errors affect the transmission of the "polling" commands sent by the PCU. To avoid this, it is proposed that a protection specific to the downlink data blocks whose MAC header has the bit S/P=1 be applied.

In the case of the GPRS, a variable level of protection can be selected block by block within a TBF, by the choice of a coding scheme (CS) from among four schemes CS-1 to CS-4 specified in the European Standard ETSI EN 300 909, Digital cellular telecommunications system (Phase 2+); Channel coding (GSM 05.03, version 6.2.1, Release 1997), published by ETSI in August 1999.

The scheme CS-4 does not use any error-correction coding, that is to say that the coding rate is equal to 1: only a block check sequence BCS is adjoined to the data blocks. The schemes CS-1 to CS-3 use a convolutional code with rate ½ after the addition of the BCS sequence. No puncturing is carried out in the CS-1 scheme (which offers the highest level of protection), while puncturing is applied in the CS-2 and CS-3 schemes so that they give rise to overall coding rates of about ⅔ and of about ¾, respectively.

The CS-1 ($1 \leq i \leq 4$) channel coding is applied at the level of the physical-layer protocol, that is to say in the BTSs in the case of the downlinks. Each coded RLC/MAC block is composed of 456 bits and is transmitted in corresponding time intervals of four TDMA frames on a carrier frequency, the successive TDMA ("Time-Division Multiple Access") frames each being split into eight time intervals to ensure time-division channel multiplexing.

A pattern of eight signaling bits is inserted into each coded frame (two bits per time interval) so as especially to indicate which coding scheme has been applied by the transmitter.

These signaling bits are extracted from the coded block received by the addressee, in order to allow it to identify the coding scheme. The receiver then carries out the appropriate decoding of the block which will give rise to a positive acknowledgement if it is successful and if the decoded BCS is consistent with the content of the block.

The coding scheme applied to the downlink is determined in a way which is known in itself by the PCU on the basis of measurements of reception quality on the radio link, according to link-adaptation mechanisms which seek to achieve an objective in terms of rate of error-affected blocks so as to optimize the raw throughput. The scheme selected is inserted into the TRAU frame carrying the block so as to be applied by the BTS.

Each time a coding scheme other than CS-1 is determined by the link adaptation mechanisms, the RLC/MAC layer selects a scheme which is more robust to errors for each block whose MAC header has the bit S/P=1. In particular the CS-1 scheme (maximum level of protection) may be adopted systematically for these blocks which contain acknowledgement requests.

It should be noted that this systematic selection of the CS-1 scheme might not be applied when the TBF is in the termination phase and when all the RLC data of this TBF have been sent at least once. Specifically, the 1997 release of the RLC/MAC protocol of GPRS prescribes the resending of the data in the same code as the first send. For example, if only blocks already sent in CS-4 are to be resent in the termination phase of the TBF, the repetitions will also be coded in CS-4 even if their MAC header contains S/P=1. However, certain link adaptation mechanisms tend to favor a more robust coding scheme at the end of a TBF, so that the risks of window blocking remain small.

The invention claimed is:

1. A method for transmitting data in acknowledged mode between a control unit and a terminal, wherein the control unit produces a sequence of blocks each comprising a header and data to be transmitted, and the blocks are transmitted to the terminal, each block being transmitted with a level of protection against errors selected from several predefined levels, the selected level being indicated in signaling information accompanying the transmitted block, wherein the header of each block comprises an acknowledgement control field activated intermittently by the control unit so as to request an acknowledgment of blocks from the terminal, wherein a higher level of protection is selected for the transmission of at least one block whose header has an activated acknowledgment control field than for the transmission of the blocks the acknowledgement control field of whose header is not activated.

2. The method as claimed in claim 1, wherein a maximum level of protection is selected for the transmission of the block whose header has an activated acknowledgement control field.

3. The method as claimed in claim 1, wherein the transmission of the blocks to the terminal is inhibited outside of a window composed of a specified number of blocks and whose position in the sequence is determined by the control unit on the basis of acknowledgment information received from the terminal in response to the blocks whose header has an activated acknowledgment control field.

4. The method as claimed in claim 1, wherein the predefined levels of protection against errors result from a channel coding of adjustable rate to which the blocks are subjected.

5. A packet control unit, comprising means of producing at least one sequence of blocks each comprising data to be transmitted and a header including an acknowledgement control field, means for transmitting the blocks of the sequence to a terminal, means of selecting a level of protection against errors for the transmission of each block of the sequence, from several predefined levels, and means of intermittent activation of the acknowledgment control field in the header of the blocks of the sequence so as to request an acknowledgement of blocks from the terminal to which the block is transmitted, wherein the means of selection are devised to select a higher level of protection for the transmission of at least one block whose header has an activated acknowledgment control field than for the transmission of the blocks the acknowledgment control field of whose header is not activated.

6. The control unit as claimed in claim 5, wherein the means of selection are devised to select a maximum level of protection for the transmission of the block whose header has an activated acknowledgment control field.

7. The control unit as claimed in claim 5, wherein the transmission of the blocks to the terminal is inhibited outside of a window composed of a specified number of blocks and having a position in the sequence determined on the basis of acknowledgment information received from the terminal in response to the blocks whose header has an activated acknowledgment control field.

* * * * *